United States Patent Office 2,986,847
Patented June 6, 1961

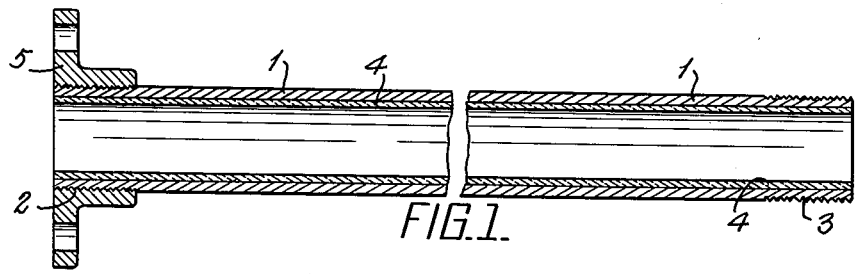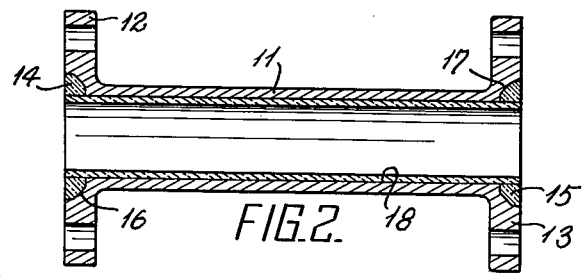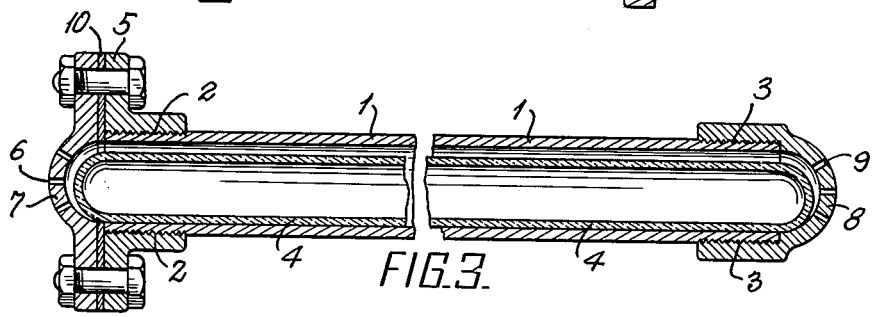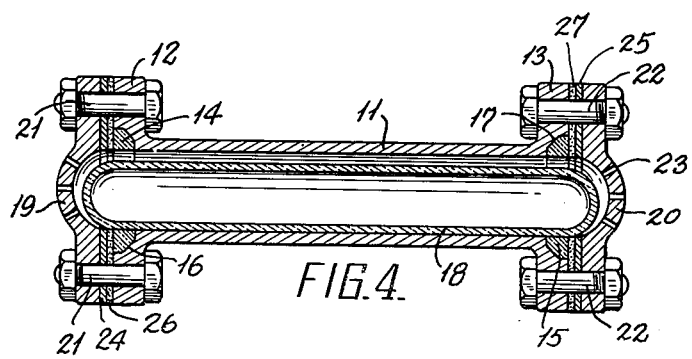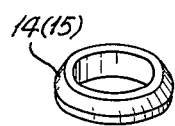

2,986,847
PROCESS FOR LINING METAL PIPES WITH GLASS
Minoru Sato, Tokyo, Japan, assignor to Iwaki Garasu Kabashiki Kaisha, Tokyo, Japan, a corporation of Japan
Filed Sept. 17, 1957, Ser. No. 684,563
11 Claims. (Cl. 49—79)

The present invention relates to method for lining metal pipes or tubes with glass.

The present invention has for its object to provide a process for firmly applying glass linings to inner surfaces of metal pipes or tubes of different shapes and sizes.

Another object of the present invention is to provide a simple, mass production process for lining metal tubes with glass to render them highly resistant to corrosive action of various chemicals.

Other objects, features and advantages of the invention will be apparent from the following description.

It is a well known fact that metal tubes have a deficiency that they are liable to be attacked by acids, alkalis and salts. It has been proposed as a remedy therefor to apply a coating of vitreous or porcelain enamel onto the inner surface of metal tubes. However, such enamel coating does not provide safe and sound corrosion resistance because of the usual presence of pinholes therein and the low stability of such coating. A method also has been proposed in which the inner surface of a metal tube is coated with some anti-corrosive paint or lined with rubber or other lining material, but no safe and sound corrosion resistance can be expected in such method.

According to the present invention there are provided products having chemical resistance, heat resistance, surface smoothness and other properties characteristic of glass, in which mechanical weakness, a deficiency of glass, is completely compensated for by the strength of a metal tube while, as a result of the manufacturing process as will be fully described hereinafter, the resistance of the glass to thermal shock and the mechanical strength thereof are highly improved by the combination of the aforesaid properties of both the glass and the metal.

Consequently, according to the present invention, metal tubes can be manufactured on a mass production basis and at reduced prices, which have a stable anticorrosive property to different chemicals, while overcoming the deficiencies of conventional glass and metal tubes by utilizing the characteristic properties of glass as described hereinbefore and lining the inner surface of the metal tubes with a glass tube securely and firmly by a simple and easy procedure.

According to the present invention, into a metal tube or pipe is inserted a glass tube having a shrinkage less than that of the metal and having a length substantially equal to that of the metal tube, and then by directly or extraneously heating the metal tube, the glass tube inside is heated together with the metal tube through the transfer of heat. The glass tube softened by such heating is then inflated or expanded by the pressure developed within such tube or introduced into the interior thereof and thus adheres to the inner peripheral surface of the metal tube while as the latter is cooled it shrinks and tightly embraces the glass tube adhered to the inner peripheral surface of the metal tube, so that the glass tube comes to have apparently a so-called shrink fit with the metal tube. Thus, the glass lining tube inside is rigidly embraced by said surrounding metal tube, with a compressive stress produced in said glass tube as the metal tube shrinks by cooling, so that there is no danger for the glass tube to slip off. When the finished lined tube is heated in use, only some changes of internal stresses are caused in the metal and glass portions, entailing no danger of their relative displacement or slipping off due to the difference between their thermal expansion coefficients. The terms "adhere" and "adheres" are used herein in the sense of close mechanical juxtaposition or embracement of one part by another such as the embracement of the glass tube by the metal tube.

Since the present invention is directed to the adhesion of a glass tube to the inner peripheral surface of a metal tube by means of the aforesaid process, it can be applied quite effectively to metal tubes of different shapes and sizes as long as a glass tube can be inserted into the metal tube. For example, the invention can be applied quite precisely not only to straight tubes but also to bent, tapered, branched and otherwise shaped pipes.

For the purpose of convenience, a long straight metal pipe produced according to the present invention may be, if necessary, divided into a number of short pipes or tubes of the desired length by means of a cutter, after which the cut face of each of the divided pipes or tubes can be ground.

Further, while the terms "metal pipes or tubes" as referred to in this specification and in the appended claims primarily indicate steel pipes and cast iron pipes, it will be apparent that pipes made of other than those just mentioned can also be used, if required. Furthermore, the term "glass tube" indicates tubes made of any of glasses such as soda-lime glass, borosilicate glass, potash glass and lead glass. The selection of any specific type of glass depends conveniently upon the use and purpose of the finished lined pipe.

Heating for the purpose of the lining according to the present invention may be effected, for example, by any of the following procedures or by any combination thereof. For example, a glass tube having a diameter such as to fit with some clearance in a metal tube to be lined is first inserted therein and thereafter is heated together with the metal tube. In this case, preheating is preferably effected without employing such high heating rate as to cause glass breakage, and then the glass is so subjected to heating that the temperature thereof is raised gradually until the glass is softened by such heating, and is inflated or expanded by the pressure developed in or introduced into the interior thereof so as to be pressed against the inner surface of the metal. Then, a suitable cooling follows.

The heating processes will further be described in detail. They include:

(a) A process wherein respective portions of the object to be heated are uniformly heated in a high temperature atmosphere.

(b) A process in which the object to be heated is heated successively, for example, from the medial portion thereof towards the opposite ends or from one end thereof to the other end by holding the object in place in the heating chamber, each of various portions of the interior of such chamber being given different temperatures in succession; by doing this, gases present in the space between the outer surface of the glass tube and the inner surface of the metal tube are easily driven off, so that the danger that any air spaces or blisters may be left between the two tubes is entirely obviated.

(c) A process wherein the interior of the heating chamber is progressively heated in an axial direction at a definite temperature gradient and the object to be heated is heated in the chamber while being moved axially therein. In this case, the object to be heated is gradually heated from one end to the other, with effects similar to those described above in (b); and this process is quite suitable for a mass production.

For instance, in lining a steel pipe with a tube of glass comprising 71.0 percent $SiO_2$, 3.7 percent $Al_2O_3$, 5.8 percent CaO, 0.2 percent MgO, 17.5 percent $Na_2O$, 0.6 percent $K_2O$ and 1.2 percent $B_2O_3$, the assembly to be heated is slowly moved in the heating chamber from the low temperature region thereof through the higher temperature regions to the hottest region maintained at 620° C. and further to a comparatively low temperature region, and finally carried out of the heating chamber.

(d) A process wherein the tube assembly is heated while being held in a definite position in a heating chamber kept at a uniform temperature, with the exterior surface of the metal tube previously coated with a poor thermal conductive material, such as asbestos kneaded with sodium silicate, of regionally different thicknesses.

On this occasion, the rate of heating of the object to be heated varies with the manner in which the poor conductive material is applied, and the effects similar to those produced by the process (b) are obtained. This process is particularly effective when used for tubes of any complicated shape or of a shape of which a portion or portions have a different heat capacity from that of the remaining portions.

(e) A process in which heat is generated by an electric current passing through the metal tube itself. For instance, a large low voltage electric current is directly passed or high frequency induction heating is effected. In an example, to line a steel pipe of 1 inch nominal inner diameter with a glass tube, the object to be heated is preheated, for example, to 200° C. and then, while it is moved at a speed of 10 centimeters per minute through a coil of 5 turns and 50 millimeters long, which conducts a current of a frequency of 7 megacycles at an input of 5.6 kilowatts by means of a high frequency oscillator of 6 kilowatt capacity, compressed air is introduced into the interior of the glass tube to accomplish lining thereof.

(f) Especially when it is needed to prevent the metal from being oxidized in heating, the heating treatment is carried out in a non-oxidizing atmosphere.

Next, in the lining process in accordance with the invention, pressure may be applied within the interior of the glass tube inside by any of the following procedures or combinations thereof:

(a) The glass tube to be inserted into the metal tube is closed at one end while the opposite end is open, compressed air being forced in through the opening at a proper time after the glass tube has been softened by heating.

(b) The glass tube to be inserted into the metal tube is sealed at the opposite ends. On such sealing, air or other gas of a specified pressure and a room temperature or other specified temperature is introduced into the interior of the tube. The air or gas is heated as the glass tube is heated so that the internal pressure is gradually elevated to reach the desired value when the glass is softened and the objective of lining is attained.

For instance, in lining a steel pipe of 4 inches nominal inner diameter with glass, there is used a glass tube of 90 millimeter outer diameter and 2.5 millimeter thickness the open ends of which tube was sealed while keeping the internal air thereof at a temperature of 40° C. under atmospheric pressure. In general, the larger the tube diameter is, the higher temperature is used in sealing. In other words, the temperature in sealing is so adjusted that, when the highest temperature is reached in the lining process, the internal pressure (final internal pressure) of the glass tube will become ordinarily to approximately 1.2 kg./cm.² at gauge pressure.

(c) The glass tube to be inserted into the metal tube is sealed with a suitable amount of a solid or liquid substance which vaporizes by heat, for example, iodine or water, filled therein.

Water, for example, turns into steam when heated, serving to produce internal pressure as in the aforesaid procedure (b). Water is quite seldom used alone, and in most cases is used in connection with the aforesaid procedure (b) or the following procedure (d).

(d) The glass tube to be inserted into the metal tube is sealed with a suitable amount of proper substance which may be decomposed into gases by heat, for example, potassium perchlorate or ammonium nitrate, filled in said glass tube. This procedure is desirably employed with tubes having smaller inner diameters or with tubes requiring final internal pressures larger than usual, because the pressure of internal gases in such tubes is insufficient when heated only by the procedure as described in (b).

For instance, in case a tube of 1 inch nominal inner diameter and 1 meter length is to be lined with glass, 0.15 grams of potassium perchlorate is sealed in addition to air of room temperature and atmospheric pressure in a glass tube of 22.5 millimeter outer diameter, 2.5 millimeter wall thickness and approximately one meter length. During the preheating process, the pressure increase within the glass tube is caused only by the pressure increase of the internal air, but, when the temperature is raised, for example, to 610° C., the potassium perchlorate is decomposed to produce gaseous oxygen ($O_2$), which in turn increases the internal pressure together with the internal air as the temperature is raised higher.

Furthermore, ammonium nitrate is also to be recommended as such gas producing agent. Whichever gas producing agent may be used, the amount to be sealed in is properly determined in accordance with the size, length, and the like of the tube.

In lining metal tubes with glass according to the present invention, the metal tubes are generally used in the form of simple straight pipes, bent pipes, tapered pipes or branched pipes for common use. However, straight, bent or tapered pipes with flanges at opposite ends, or branched pipes having flanges at respective open ends are also used. As for glass tubes, they are used in the form corresponding to that of mating metal tubes. In pipe arrangement where the present finished glass-lined pipes are connected to other pipes or a plurality of the present metal tubes are connected in series to each other to form a long piping or pipe line, the joints of these pipes are especially vulnerable to corrosion due to the leakage of liquid, so that, according to the present invention, ring made of glass (which will be hereinafter referred to as a glass packing ring) is each previously fitted into an annular recess provided around the edge of each end opening of the axial bore of the metal tube so as to extend further into the end face, with the inner peripheral surface of said ring substantially in register with that of the metal tube, and, when the latter is heated in a manner as hereinbefore described and thereby internally lined with a desired glass tube. The said rings likewise are heated so as to adhere to respective end portions of the metal tubes, while at the same time the outer peripheral surfaces of the open ends of such glass tube are fused to said glass rings which in turn are adhered to the metal tube ends as just described, thus the metal tube, the glass lining tube and the glass rings being incorporated into an integral unit. Especially when the aforesaid glass rings are thus secured to the edges of the end openings of metal tubes lined with glass tubes as previously described in accordance with the present invention, the area of the anti-corrosive joint surfaces at the ends of the present metal tubes is accordingly increased so that the corrosion of the joints of these metal tubes due to leakage of liquid can quite effectively be prevented when such tubes are properly arranged in a pipe line or connected in series.

However, in case the finished lined pipe has no packing rings fused thereto, the area of the anti-corrosive joint surfaces at respective open ends of such lined pipe can be increased by applying to said open ends a coating of some anti-corrosive paint or a covering of some anti-corrosive substance.

Furthermore, in lining metal tubes with glass according to the present invention, straight, bent or tapered tubes can be readily treated in a single operation, while complicated metal tubes such as branched pipes require a two-step operation. Thus, such branched pipe is advantageously treated by a process comprising a combination of the following two steps: In the first step, a glass tube sealed at opposite ends and having an outer diameter smaller than the inner diameter of the main run of such branched metal pipe is first inserted into the interior of the main run; then caps are secured to the opposite ends of the main run in a manner that hot gases in the space between the metal and glass tubes can be driven off through deaerating apertures formed in one of said caps; the said metal tube is then heated so as to cause the glass tube to adhere to the inner surface of the said main run while at the same time causing the glass tube to bulge out at the region where the branch opens into the main run of the branched pipe toward the interior of the branch so as to adhere to the joint region of the branch, the bulging portion or bulge being subsequently broken away. In the second step, a second sealed glass tube having the outer diameter adapted to the inner diameter of the branch is inserted therein through the free opening of said branch; a cap is secured similarly to the open end thereof and then the branch is heated together with the second glass tube inside so that the latter is softened and expanded so as to adhere to the inner surface of said branch simultaneously the bulging layer of the second glass tube is overlapped on and adheres to the glass layer which has adhered to the interior of the joint region of the branch in the preceding step, the portion of the second glass tube which has bulged out of said joint region being subsequently broken away.

Moreover, in causing respective glass tubes to adhere to the inner peripheral surfaces of the main run and the branch for producing a finished glass-lined branched pipe, stoppers may be positioned in respective regions where the glass tube inside bulges on heating of the main run or the branch for restraining such bulging so that the glass tube may more firmly adhere to the inner peripheral surface of the main run or the branch.

In order that the present invention may be clearly understood and readily carried into effect, embodiments thereof will now be described in detail with reference to the accompanying drawings, in which FIG. 1 is a fragmentary sectional view of a finished straight lined pipe made according to the present invention and having a flange screwed at one end thereof;

FIG. 2 is a sectional view of a finished straight lined pipe made according to the invention and having flanges at both ends thereof;

FIG. 3 is a sectional view of an embodiment of the invention for making the straight lined tube shown in FIG. 1;

FIG. 4 is a sectional view showing another embodiment of the invention for use in making the straight lined tube having flanges at both ends thereof and shown in FIG. 2;

FIG. 5 is a perspective view of a packing ring made of glass and V-shaped in section;

Figure 8:
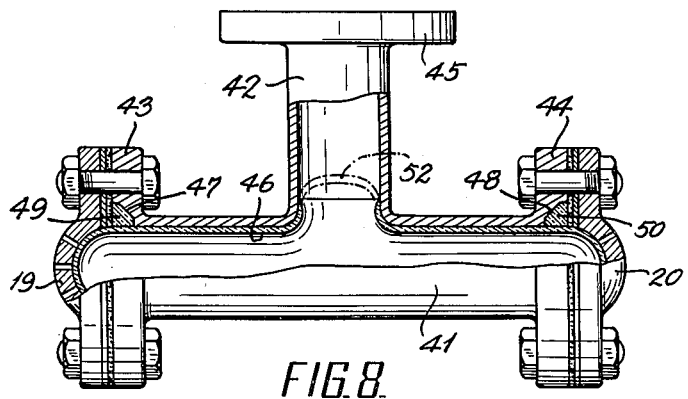
Figure 9:
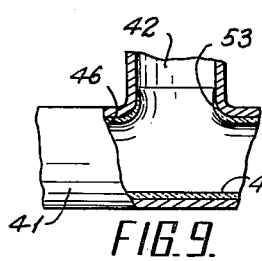
Figures 10, 11:
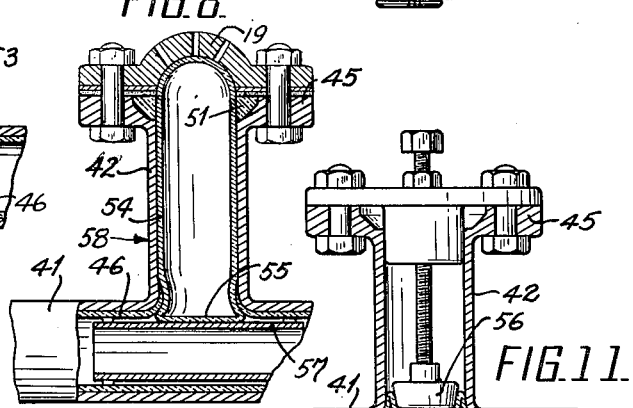
Figure 12:
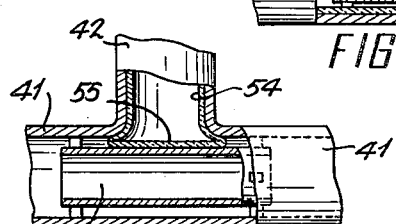

FIGS. 8 to 10 inclusive are views showing respective processes for lining a branched pipe with a glass tube according to another embodiment of the invention; and FIGS. 11 and 12 are fragmentary sectional views showing the manner by which a stopper is used so as to enable the glass tube to adhere more firmly to the inner peripheral surface of either the main run or the branch in lining a branched pipe.

Referring now to the drawings, particularly to FIGS. 1 and 3, there is shown a long straight tube 1 having both end portions 2 and 3 threaded. 4 denotes a glass tube closed at the opposite ends and inserted into the interior of said straight tube 1; 5 denotes a flange screwed on the threaded portion 2 at one end, and to which flange is secured by bolting a cap 7 provided with deaerating apertures 6. 8 denotes a cap screwed on the threaded portion 3 at the other end and likewise provided with deaerating apertures 9. 10 denotes an annular disc interposed between said flange 5 and said cap 7 when they are bolted together.

FIGS. 1 and 3 will further be referred to.

In the finished straight lined tube shown in FIG. 1, the metal tube 1 is internally lined with the glass tube 4 and has the flange 5 screwed at one end. Respective end faces of the metal tube having the glass tube fused to the interior thereof are adequately finished. In addition, the heating of the metal tube and adhesion of the glass tube thereto may be accomplished by any of the aforesaid processes (b), (c) and (d) or any combination of such processes.

FIG. 3 illustrates an embodiment adapted for the manufacture of straight tubes as shown in FIG. 1, wherein the metal tube 1 to be lined is previously subjected to oil scorching, descaling, brushing, sandblast and other preliminary treatments after the mounting of the flange 5 and other necessary workings. Apart from this, the glass tube is made by forming the glass perfectly melted in the glass melting furnace into a tubular form and then working it to seal both ends thereof. On this occasion, the outer diameter of the glass tube is selected so as to correspond substantially to the inner diameter of the metal tube 1. Further, in sealing the glass tube, any of suitable gas, liquid or solid substances which may generate or develop pressure when heated is previously sealed in as described hereinbefore. Cap 7 is thereafter secured by bolting to the flange 5 mounted on one open end portion of the metal tube 1, while a cap 8 is screwed on the threaded portion 3 at the opposite open end of the metal tube.

When the object to be heated as assembled in the above manner is heated by any of the aforesaid heating processes or by any combination thereof, the glass tube 4 inside is softened by heat and expanded under pressure within the glass tube itself, so that the glass tube adheres to the inner surface of the metal tube 1. The assembly may subsequently be cooled suitably. After cooling, the caps 7 and 8 are removed and the end face portions of the glass tube cut off. By grinding the metal tube 1 thus lined with the glass tube 4 together with the metal end faces, a finished metal tube having desired glass lining is obtained.

Referring to FIGS. 2 and 4, there is shown a straight pipe 11 provided at the opposite open ends thereof with flanges 12 and 13 respectively. 14 and 15 are glass packing rings in section of V-shape and fitted into respective annular recesses 16 and 17 provided around the edges of the end openings at opposite ends of said straight pipe. The ring section may alternatively be in any adequate shape other than said V-shape as required. 18 denotes a glass tube adhering to the inner peripheral surface of the metal tube 11 and fused at opposite ends to said packing rings 14 and 15. 19 and 20 are caps to be fastened by a number of bolts 21 and 22 to said flanges 12 and 13 respectively, one cap 20 also being provided with deaerating aperatures 23. It will be understood that the cap 20 which has deaerating apertures 23 as described above is located on the side where gases present in the clearance between the metal tube 11 and the glass tube 18 therein are to be discharged or driven off when the metal tube 11 is heated from one side to the other, for example, from left to right. 24 and 25 denote respectively annular metallic discs respectively interposed between said flanges 12, 13 and said caps 19, 20 at opposite sides of the metal tube 11, 26 and 27 respectively packing material filled between said metal discs 24, 25 and flanges 12, 13.

Reference is again made to FIGS. 2 and 4.

In the finished straight lined pipe having flanges at opposite ends thereof as shown in Fig. 2, the metal tube 11 having flanges 12 and 13 at opposite ends thereof is lined with the glass tube 18. These metal and glass tubes are made integral, metallic flanges 12 and 13 being mounted on the metal tube 11 so as to facilitate the connection thereof in pipe arrangement. Further, to increase the area of the anticorrosive joint surface at either open end, packing rings 14 and 15 made of glass are secured to the open ends and fused integrally with the glass tube 18 inside, each of the end faces thereafter being ground adequately. In addition, the heating of the metal tube and adhesion of the glass tube thereto may be effected by any of the hereinbefore described processes (b), (c) and (d) or any combination of such processes.

FIG. 4 illustrates an embodiment of the invention adapted for the manufacture of straight tubes having flanges at opposite ends thereof, wherein the metal tube 11 to be lined and having annular recesses 16 and 17 formed around the edges of the end openings of such metal tube so as to extend further into the respective end faces is previously subjected to oil scorching, descaling, brushing, sandblast and other preliminary treatments after the mounting of flanges 12 and 13 and other necessary workings, as set forth above in connection with FIG. 3. On the other hand, the glass tube is made by forming the glass melted in the glass melting furnace into a tubular form and then working it to seal both ends thereof, as described hereinbefore in connection with FIG. 3. In this case, the outer diameter of said glass tube 18 is selected so as to suit substantially with the inner diameter of the metal tube 11. Further, in sealing the glass tube, any of suitable pressure-producing substances as described above is previously sealed therein. Meanwhile, after packing rings 14 and 15 made of glass have been fitted into the annular recesses 16 and 17 at the opposite open ends of the metal tube 11, the glass tube 18 is inserted into the metal tube. On the other hand, between the caps 19, 20 and flanges 12, 13 is filled packing material, such as gypsum, as indicated at 26 and 27 respectively, in order to prevent the glass inside from bulging out from between the caps and flanges and to prevent the gases escaping out from between them, metallic discs 24 and 25 also being inserted therein to provide such a shearing force that the lining glass tube may be cut at opposite ends circumferentially with ease and uniformity after the completion of the lining process. Caps 19 and 20 are thereafter secured by bolting to flanges 12 and 13 at opposite open ends of the metal tube 11.

When the object to be heated as assembled in such a manner is heated by heating the metal tube 11 by means of any of the aforesaid heating processes or by means of any combination thereof, the glass tube 18 placed inside is softened by heat and expanded under pressure within the glass tube itself so as to adhere to the inner surface of the metal tube 11 and also be fused to the inner peripheral surface of the glass packing rings at opposite ends thereof. The assembly may subsequently be cooled suitably. After such cooling, the caps 19 and 20 are removed, the end portions of the glass tube 18 being simultaneously automatically cut off substantially along the end faces thereof. By grinding the metal tube 11 which has thus been lined with glass tube 18 as well as the end faces thereof, a finished metal tube having glass lining is obtained.

Figure 6:
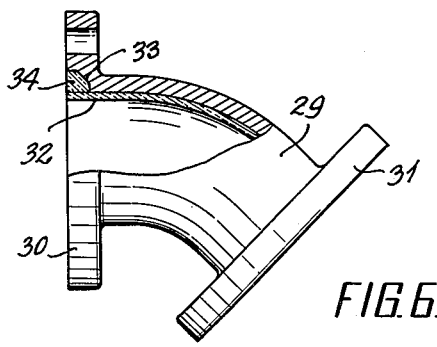
FIG. 6 is a side view, partially in section, of further embodiment of the invention in the form of a finished lined metal tube bent arcuately.

Referring now to Fig. 6, numeral 29 denotes a metal tube bent arcuately, which is provided at opposite ends with flanges 30 and 31, and lined with a glass tube 32, 33 an annular recess provided around the edge of either open end of the bent metal pipe 29 and into which a glass packing ring 34 is fitted.

Figure 7:
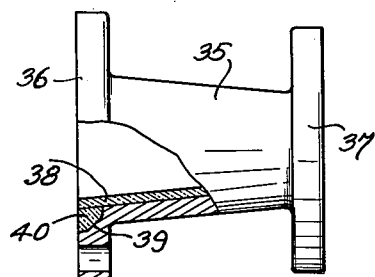
FIG. 7 is a side view, partly in section, of still another embodiment of the invention in the form of a finished tapered lined metal tube.

In FIG. 7, there is shown a tapered metal tube 35 having flanges 36 and 37 provided at opposite ends thereof. 38 is a glass tube, 39 an annular recess provided around the edge of either open end of the metal tube 35 and into which a glass packing ring 40 is fitted.

Said metal tubes 29 and 35 shown in FIGS. 6 and 7 respectively have respective packing rings 34 and 40 fused into respective recesses 33 and 39 provided at either open end of said respective metal tubes by a procedure as described in connection with the straight metal tubes shown in FIGS. 3 and 4 and also have respective glass tubes 32 and 38 adhered to the inner peripheral surface of said metal tubes.

Referring now to FIGS. 8 to 12 inclusive, 58 denotes a metal pipe system comprising a main pipe 41 and a branch pipe 42 opening at one end into the main pipe. Flanges 43 and 44 are provided at either open end of the main pipe or run and a flange 45 is provided at the open end of the branch 42. Numeral 46 denotes a glass tube layer adhered to the main run, 47 and 48 recesses provided around the edges of the end openings of the axial bore of the main run and into which respective packing rings 49 and 50 are fitted. 51 denotes a packing ring fitted into a recess provided around the edge of the end opening of the branch 42.

As indicated in dotted lines 52 in FIG. 8, when the glass tube 46 in the main run is softened by heat and fused to the inner peripheral surface of the metal tube 41 as well as packing rings 48 and 49 under pressure within the glass tube 46, the glass tube bulges in the region, where the branch 42 opens into the main run, toward the interior of said branch 42, growing thinner in section.

Referring to FIG. 9, the portion 52 of the glass bulging out said branch 42 of the branched pipe as described above has been lightly struck and broken away, and the bulging portion of the glass tube 46 lining the main run adheres, as shown, to the inner peripheral surface of the joint region of the branch 42, the numeral 53 designating such adhering glass layer.

FIG. 10 shows the manner in which further glass lining is laid over the entire inner peripheral surface of the branch 42, covering the said glass layer 53 lining the joint region of the branch 42 as shown in FIG. 9.

To line the branch 42 with glass, a two step process is employed as described hereinafter. Thus, in the first step, packing rings 49 and 50 are fitted into respective recesses 47 and 48 provided at opposite ends of the metallic main run 41, for example, in the same manner as described above in connection with FIG. 4, and the glass tube 46 is then inserted into said main run 41 and caused to adhere to the inside thereof in the same manner as described in connection with FIG. 4. On this occasion, the glass tube in the joint opening of the branch 42 bulges toward the interior thereof to adhere to the inner peripheral surface of the branch, the end portion of the bulge, which is not fused to such surface, being struck and broken away. Thus, the inner peripheral surface of the main and a part of the inner peripheral surface of the branch are coated with a glass lining layer (see FIGS. 8 to 10). In the second step of the process, a packing ring 51 is fitted into a recess provided at an open end of the metal branch pipe 42. A second sealed glass tube 54 which has an outer diameter substantially equal but slightly smaller than the inner diameter of branch pipe 42 is then inserted into pipe 42. Apertured cap 19 is secured by bolts and nuts to the flange 45 at the open end of pipe 42. The branch pipe 42 is then heated. The sealed glass tube becomes softened by the heat transferred to the tube from the heated pipe. The air within the tube 54 becomes heated and increases in pressure. The heated air forces the softened glass tube to expand under pressure to cover and adhere to the inner surface of the branch pipe 42 and to the glass lining layer 53, which has been fused to the inside of the joint region of the branch 42 in the first step of the process. While tube 54 expands, air which is between the tube and pipe 44 is expelled through the apertured cap 19 on the end of pipe 42. Subsequently, the portion 55 of the glass tube 54 bulging from the branch opening into the main is lightly struck and broken away, thereby producing a required branched metal pipe having glass lining.

Incidentally, it is evident that, in glass lining of branched pipes in a manner as described above, said first and second steps may be carried out in the reversed order.

Further, for the purpose of enabling that portion of said bulge 52 or 55, which is to adhere to the inner peripheral surface of the metal tube, to be pressed more firmly against such surface, a stopper 56 or 57 may advantageously be arranged beforehand in a place where the glass tube is to bulge on heating the metal tube in such a manner that an annular clearance is provided between the periphery of said stopper and the inner surface of the metal tube and the central portion of the bulge will be restrained in a definite position by said stopper 56 or 57. By such procedure, when the glass tends to bulge, the bulging portion of glass is prevented by such stopper from bulging further and thus penetrates into the clearance between the stopper and the inside surface of the pipe, so that the bulging portion adheres more firmly to the inner peripheral surface of the metal tube (see FIGS. 11 and 12).

What I claim is:

1. A process for lining metal pipes with glass, comprising the steps of inserting a sealed glass tube containing a thermally expansible medium into a metal pipe, said pipe and tube having different thermal coefficients of expansion, heating the pipe to expand the same and to heat the tube and medium, continuing the heating until the tube softens and the medium expands pressing the outer surface of the tube into contact with the inner surface of the expanded pipe, cooling the pipe to shrink the pipe into forceful compressive embracement of the tube, and continuing the cooling until the softened tube solidifies and the expanded medium contracts, leaving the tube permanently embraced by the pipe.

2. A process for lining metal pipes with glass, comprising the steps of filling a glass tube with a gas, sealing ends of the tube to retain the gas therein, inserting the tube into a metal pipe having an inner peripheral surface larger in diameter than the diameter of the outer peripheral surface of the tube, said tube having a length substantially coextensive with the length of the pipe, said pipe and tube having different thermal coefficients of expansion, heating the pipe to expand the same and to heat the tube and gas by conduction, continuing the heating until the tube softens and the gas expands pressing the outer peripheral surface of the tube into contact with the inner peripheral surface of the expanded pipe, cooling the pipe to shrink the pipe into forceful, compressive embracement of the tube, and continuing the cooling until the softened tube solidifies and the expanded gas contracts leaving the tube permanaently embraced by the pipe.

3. A process for lining metal pipes with glass, comprising the steps of inserting a gas forming medium into a glass tube, sealing ends of the tube, inserting the tube into a metal pipe having an inner peripheral surface larger in diameter than the diameter of the outer peripheral surface of the tube, said tube having a length substantially coextensive with the length of the pipe, said pipe and tube having different thermal coefficients of expansion, heating the pipe to expand the same and to heat the tube and gas forming medium by conduction, continuing the heating until the tube softens and the medium forms a gas expanding and pressing the outer peripheral surface of the tube into contact with the inner peripheral surface of the expanded pipe, cooling the pipe, tube and gas to shrink the pipe into forceful, compressive embracement of the tube, and continuing the cooling until the softened tube solidifies and the expanded gas contracts leaving the tube permanently embraced by the pipe.

4. A process for lining metal pipes with glass, comprising the steps of inserting a glass ring into an annular recess at an open end of a metal pipe, inserting a sealed glass tube containing a thermally expansible medium into the metal pipe, said pipe having a different thermal coefficient of expansion from that of the tube and ring, heating the pipe to expand the same and to heat the tube, ring and medium, continuing the heating until the tube and ring soften and fuse together and the medium expands pressing the outer surfaces of the tube and ring into contact with inner surfaces of the expanded pipe and recess respectively, cooling the pipe to shrink the pipe into forceful compressive embracement of the tube and ring, and continuing the cooling until the softened tube and ring solidify and the expanded medium contracts leaving the tube and ring permanently embraced by the pipe.

5. A process for lining metal pipes with glass, comprising the steps of inserting a glass ring into an annular recess at an open end of a metal pipe, inserting a sealed glass tube containing a thermally expansible medium into the metal pipe, said pipe having a different thermal coefficient of expansion from that of the tube and ring, securing caps to the ends of the pipe, one of said caps being apertured, heating the pipe to expel air trapped between the pipe and tube through the apertured cap, further heating the pipe to expand the same and to heat the tube, ring and medium, continuing the heating until the tube and ring soften and fuse together and the medium expands pressing the outer surfaces of the tube and ring into contact with inner surfaces of the expanded pipe and recess respectively, cooling the pipe to shrink the pipe into forceful compressive embracement of the tube and ring, and continuing the cooling until the softened tube and ring solidify and the expanded medium contracts leaving the tube and ring permanently embraced by the pipe.

6. A process for lining metal pipes with glass, comprising the steps of inserting a sealed glass tube containing a thermally expansible medium into a metal pipe, said pipe and tube having different thermal coefficients of expansion, applying caps to ends of the pipe, one of said caps being apertured, heating the pipe to expel air trapped between the pipe and tube through the apertured cap, further heating the pipe to expand the same and to heat the tube and medium, continuing the heating until the tube softens and the medium expands pressing the outer surface of the tube into contact with the inner surface of the expanded pipe, cooling the pipe to shrink the pipe into forceful compressive embracement of the tube, and continuing the cooling until the softened tube solidifies and the expanded medium contracts, leaving the tube permanently embraced by the pipe.

7. A process according to claim 6, wherein said medium is a gas forming solid.

8. A process according to claim 6, wherein said medium is a gas forming liquid.

9. A process according to claim 6, wherein said medium is a gas.

10. A process for lining with glass a pipe system comprising a main metal pipe and a branch metal pipe having an opening into the main pipe, comprising the steps of inserting a first sealed glass tube containing a thermally expansible medium into the main pipe of said system, securing caps to opposite ends of the main pipe, one of the caps being apertured, heating the main pipe to expand the same and to heat the tube and medium, continuing the heating until the tube softens and the medium expands pressing the outer surface of the tube into contact with the inner surface of the expanded pipe while a portion of the tube bulges out of the main pipe into the opening of the branch pipe of said system, whereby air trapped between the main pipe and tube is expelled through the apertured cap, cooling the main pipe to shrink the main pipe into forceful compressive embracement of the tube, continuing the cooling until the softened tube solidifies and the expanded medium contracts leaving the tube permanently embraced by the main pipe, breaking away the solidified bulging portion of the tube, inserting a second sealed glass tube containing another thermally expansible medium into the branch pipe, securing another apertured cap to an outer end of the branch pipe, heating the branch pipe to expand the same and to heat the second tube and other medium, continuing the heating until the second tube softens and the other medium expands pressing the outer surface of the second tube into contact with the inner surface of the expanded branch pipe while an end portion of the second tube bulges out into the first tube through said opening and fuses with the first tube thereat, whereby air trapped between the branch pipe and the second glass tube is expelled through the other apertured cap, cooling the branch pipe to shrink the branch pipe into forceful compressive embracement of the second tube, continuing the cooling until the softened second tube solidifies and the expanded medium contracts leaving the second tube permanently embraced by the branch pipe, and breaking away the solidified bulging end portion of the second tube.

11. A process for lining with glass a pipe system comprising a main metal pipe and a branch metal pipe having an opening into the main pipe, comprising the steps of inserting glass rings into recesses at open ends of joined main and branch pipes of said system, inserting a first sealed glass tube containing a thermally expansible medium into a main pipe of said sytem, securing caps to opposite ends of the main pipe, one of the caps being apertured, heating the main pipe to expand the same and to heat the tube, medium and two of the rings at the ends of the main pipe, continuing the heating until the tube and two rings soften and the medium expands pressing the outer surface of the tube into contact with the inner surface of the expanded pipe while a portion of the tube bulges out of the main pipe into an opening of the branch pipe and the two rings fuse to the tube, whereby air trapped between the main pipe and glass tube is expelled through the apertured cap, cooling the main pipe to shrink the main pipe into forceful compressive embracement of the tube and two rings, continuing the cooling until the softened tube and two rings solidify and the expanded medium contracts leaving the tube and two rings permanently embraced by the main pipe, breaking away the solidified bulging portion of the tube, inserting a second sealed glass tube containing another thermally expansible medium into the branch pipe, securing another apertured cap to an outer end of the branch pipe, heating the branch pipe to expand the same and to heat the second tube, third one of said rings and other medium, continuing the heating until the second tube and third ring soften and the other medium expands pressing the outer surface of the second tube and third ring into contact with the inner surface of the expanded branch pipe while an end portion of the second tube bulges out into the first tube through said opening and fuses with the first tube thereat, whereby air trapped between the branch pipe and the second glass tube is expelled through the other apertured cap, cooling the branch pipe to shrink the branch pipe into forceful compressive embracement of the second tube and third ring, continuing the cooling until the softened second tube and third ring solidify and the expanded other medium contracts leaving the second tube and third ring permanently embraced by the branch pipe; and breaking away the solidified bulging end portion of the second tube.

References Cited in the file of this patent

UNITED STATES PATENTS

| | | |
|---|---|---|
| 476,648 | Husselbee | June 7, 1892 |
| 494,671 | Dudley-Cooper | Apr. 4, 1893 |
| 667,646 | Bergier | Feb. 5, 1901 |
| 714,903 | Hinds | Dec. 2, 1902 |
| 768,943 | Kepler | Aug. 30, 1904 |
| 785,176 | Mommertz | Mar. 21, 1905 |
| 1,053,452 | Stover | Feb. 18, 1913 |
| 1,107,386 | Voelker | Aug. 18, 1914 |
| 2,348,696 | Schabacker | May 9, 1944 |
| 2,374,763 | Martin | May 1, 1945 |
| 2,412,271 | Kercher | Dec. 10, 1946 |
| 2,464,487 | Chappell et al. | Mar. 5, 1949 |
| 2,724,672 | Rubin | Nov. 22, 1955 |
| 2,789,934 | Busbach | Apr. 23, 1957 |

FOREIGN PATENTS

| | | |
|---|---|---|
| 16,846 | Great Britain | 1891 |
| 545,544 | Great Britain | June 1, 1942 |

Notice of Adverse Decision in Interference

In Interference No. 93,051 involving Patent No. 2,986,847, M. Sato, PROCESS FOR LINING METAL PIPES WITH GLASS, final judgment adverse to the patentee was rendered June 9, 1965, as to claims 1 and 2.
[*Official Gazette December 14, 1965.*]